United States Patent
Sullivan et al.

(10) Patent No.: US 7,783,599 B2
(45) Date of Patent: Aug. 24, 2010

(54) ACTIVE DATA PUSH DELIVERY

(75) Inventors: Blake Sullivan, Redwood City, CA (US); Tal Broda, Sunnyvale, CA (US); Edward J. Farrell, Los Gatos, CA (US); Xi Li, Sunnyvale, CA (US); Congxiao Lu, Foster City, CA (US); Shailesh Vinayaka, Fremont, CA (US); Dipankar Bajpai, North Chelmsford, MA (US); Max Starets, Lexington, MA (US); David Allen Schneider, Aurora, CO (US)

(73) Assignee: Oracle International Corporation, Redwood Shores, CA (US)

( * ) Notice: Subject to any disclaimer, the term of this patent is extended or adjusted under 35 U.S.C. 154(b) by 347 days.

(21) Appl. No.: 12/031,401

(22) Filed: Feb. 14, 2008

(65) Prior Publication Data

US 2009/0210784 A1 Aug. 20, 2009

(51) Int. Cl.
*G06F 17/00* (2006.01)
(52) U.S. Cl. .................. 707/610; 707/640; 707/661; 707/674; 707/690; 707/822
(58) Field of Classification Search .......... 707/600–831
See application file for complete search history.

(56) References Cited

U.S. PATENT DOCUMENTS

| 6,842,757 | B1 | 1/2005 | Winer et al. |
| 2006/0089939 | A1 | 4/2006 | Broda et al. |
| 2008/0195646 | A1* | 8/2008 | Meijer et al. ................ 707/102 |

OTHER PUBLICATIONS

"LightStreamer, White Paper"; Jun. 5, 2006; pp. 1-33; [author unknown]; Contact: Alessandro Alinone (CTO), http://www.lightstreamer.com.
Alex Russel et al., "Bayeux Protocol—Bayeux 1.0draft1"; Dojo Foundation, Nov. 5, 2007; pp. 1-22, http://svn.xantus.org/shortbus/trunk/bayeux/bayeux.html.

* cited by examiner

*Primary Examiner*—Isaac M Woo
(74) *Attorney, Agent, or Firm*—Squire, Sanders & Dempsey, LLP

(57) ABSTRACT

A system that pushes active data to a client receives a first request for a page that includes active data from the client. The active data includes a component and a corresponding model for a data source of the component. The system determines if the model is active and if so, instantiates an encoder that corresponds to the component. The system queries the model for the active data and renders a user interface representation of the data. The system then returns a response to the request with the user interface representation.

15 Claims, 4 Drawing Sheets

ACTIVE DATA PUSH DELIVERY

FIELD OF THE INVENTION

One embodiment is directed generally to computer data, and in particular to the push delivery of computer data to a networked computer.

BACKGROUND INFORMATION

Business intelligence ("BI") systems have been developed that combine data gathering, data storage, and knowledge management with analytical tools to present complex and competitive information to planners and decision makers. Many conventional business intelligence systems include modules and programs that provide visual reporting of information regarding the status and operation of business processes in a full-page display panel known as a "dashboard". These systems frequently utilize messaging, data integration, active data caching, analytics monitoring, alerting, and reporting technologies to deliver configurable information to an end user within seconds of an enterprise event or change in status. Streaming data delivery ensures that real-time reports or data displays are automatically and continually updated as changes occur in the underlying data. Therefore, managers and business executives can monitor end-to-end business processes in real-time and make decisions and take immediate actions that impact overall business performance.

Most known BI systems utilize "push" technology to deliver data to the client. With push technology, a client receives data updates in an asynchronous manner from a server at the server's discretion, generally after expressing interest in a certain type of information. In general, the client becomes a passive part of the system, receiving updated information as soon as it is available on the server, without having to ask for it every so often. The data delivered to the client using push technology is sometimes referred to as "active" data.

SUMMARY OF THE INVENTION

One embodiment is a system that pushes active data to a client. The system receives a first request for a page that includes active data from the client. The active data includes a component and a corresponding model for a data source of the component. The system determines if the model is active and if so, instantiates an encoder that corresponds to the component. The system queries the model for the active data and renders a user interface representation of the data. The system then returns a response to the request with the user interface representation.

DETAILED DESCRIPTION

One embodiment is a system that pushes active data from an active data source to a web browser. Embodiments can enable active data support for both a server and a client.

Figure 1:
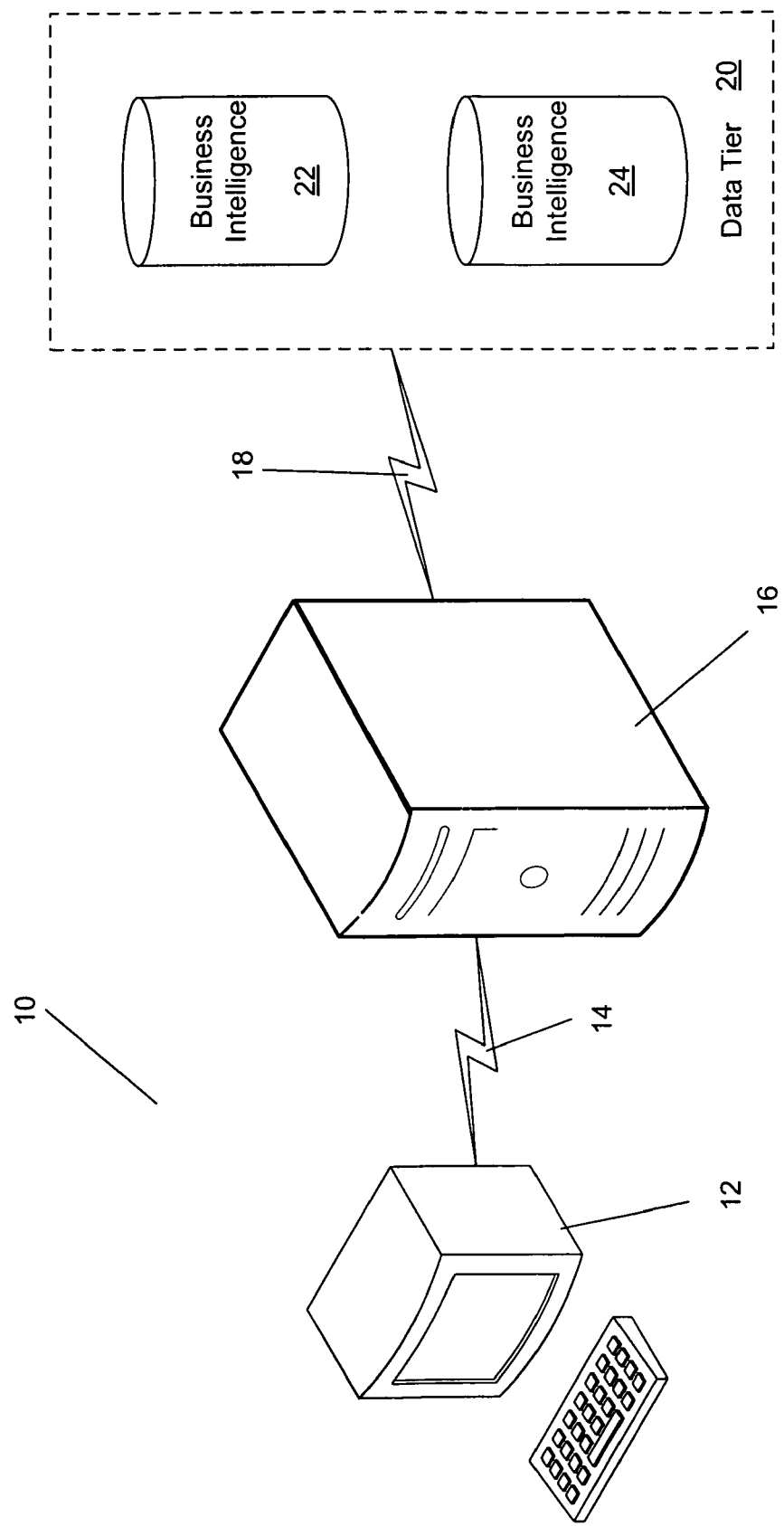
FIG. 1 is a block diagram of a system in accordance with one embodiment to push active data from a server to a client.

FIG. 1 is a block diagram of a system 10 in accordance with one embodiment to push active data from a server to a client. System 10 includes a client computer 12 that receives and displays active data in one or more web browser windows. Client computer 12 includes a processor and memory for storing instructions (not shown). The memory can be any type of memory or other computer readable medium that stores instructions that are executed by the processor. Client 12 can be any type of computer or other computing device that provides a user interface that can generate and display an Internet browser window or other type of graphical user interface ("GUI"), including a personal digital assistant ("PDA"), telephone, etc. In one embodiment, client 12 executes an operating system and an Internet browser.

Client 12 is coupled to a server computer 16 via a link 14. Link 14 is any type of local or network connection that enables client 12 to communicate and exchange data with server 16. In one embodiment, link 14 is the Internet. Server 16 includes a processor coupled to memory for storing instructions (not shown). The memory can be any type of memory or other computer readable medium that stores instructions that are executed by the processor.

Server 16 is coupled, either locally or remotely, to a data tier 20 via a link 18. Data tier 20 in one embodiment includes multiple databases 22 and 24 that store Business Intelligence ("BI") data, which in one embodiment is data that reflects the status and business operations of an organization. The data stored in data tier 20 may include data that is generated by an organization's enterprise resource planning ("ERP") system, customer relationship management ("CRM") system, customized legacy system, multi-dimensional/relational database management systems, etc. As data in these various systems change (e.g., a sale is made, a new employee is hired, payroll is processed, etc.), the changed data or "active" data is ultimately streamed to client 12 by server 16 so that the changes and updated data can be viewed by a user at client 12. In other embodiments, other types of data besides BI data may be stored on data tier 20 and streamed to client 12.

Figure 2:
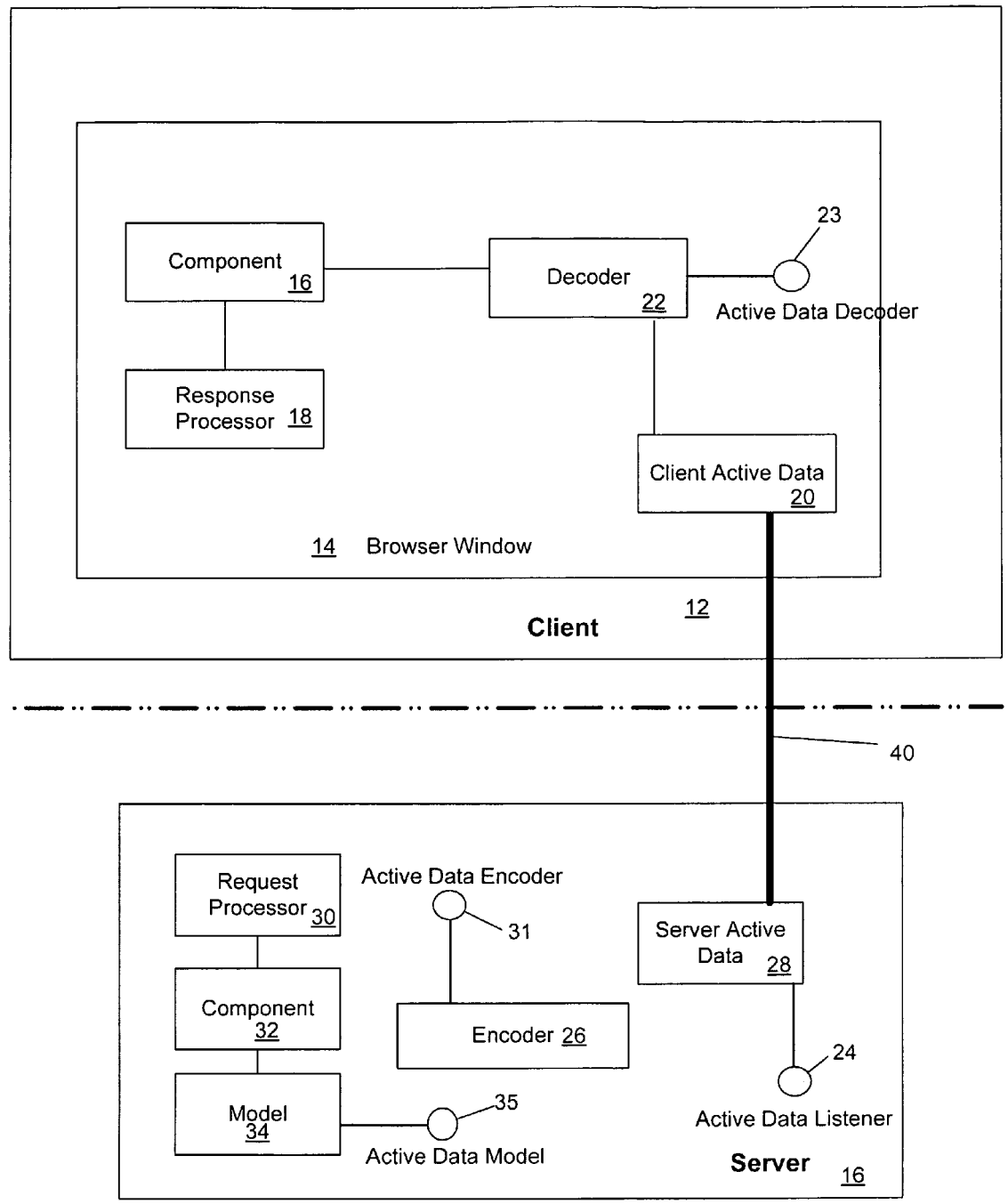
FIG. 2 is a block diagram of a client computer and a server computer in accordance with one embodiment for pushing active data from the server to the client.

In one embodiment, server 16 receives data events or active data that is transmitted or streamed to client 12 for display as a web page on a web browser window on client 12 without requiring page refreshes. In one embodiment, the data events are changing data that are generated by data tier 20. FIG. 2 is a block diagram of client computer 12 and server computer 16 in accordance with one embodiment for pushing active data from server 16 to client 12.

Server 16 includes a request processor 30 which provides the function of the server side framework for processing web requests. In one embodiment, the server side framework is the Java Platform, Enterprise Edition, from Sun Microsystems, Inc. However, any other server side framework can be used.

Server 16 further includes a component 32 which is the user interface ("UI") component and any relevant validation, query and rendering logic on the server side during request processing. In one embodiment, component 32 is a JavaServer Faces ("JSF") component. JSF, from Sun Microsystems, Inc., is a Java-based web application framework that simplifies the development of user interfaces for Java Platform, Enterprise Edition applications. JSF uses a component-based approach in which the state of user interface components is saved when the client requests a new page and then is restored when the request is returned.

Server 16 further includes a model 34 which is a representation of the data source for component 32. In one embodiment, the data source is data tier 20 of FIG. 1. However, the data source can be relational, cubic, service-oriented architecture-based, or any other external data provider. Active data model 35 is the interface or "contract" that is implemented by the model to become active data capable. In one embodiment, the contract requires that the model fire events with a monotonically increasing ID and supports the ability to fire events from a given event ID.

Server 16 further includes a data encoder 26 and a server active data module 28. Encoder 26 encodes an active data event received from model 34 before it is sent to client 12. Active data encoder 31 is the contract that a component encoder must implement in one embodiment. Server active data module 28 performs functionality disclosed below to push the active data to client 12. Active data listener 24 is the contract for the model to fire events. Server encoder 26 and client decoder 22 are coupled as a paired set so that client decoder 22 can decode the output generated by server encoder 26.

Server 16 is coupled to client 12 via a push channel 40 which can be any type of communication link that enables data to be transmitted from server 16 to client 12.

Client 12 includes a response processor 18 which provides the function of client side framework. The framework typically addresses and defines mechanisms for framework issues such as partial page refresh, drag and drop, layout, popup, messaging, eventing, etc. In one embodiment, the framework is JavaScript running in an Hypertext Markup Language ("HTML") browser. However, any type of client framework can be used.

Client 12 further includes a component 16 which is visual portion of the framework component and any logic that manipulate the visuals. In one embodiment, component 16 is a client JavaScript representation of a server-side Javaserver Faces component.

Client 12 further includes a client active data module 20. Client active data module 20 performs functionality disclosed below to receive the pushed active data from server 16. Client 12 further includes a decoder 22 that decodes the encoded active data event and renders the visual updates for component 16. Decoder 22 in one embodiment is specific to component 16 and works hand in hand with encoder 26. Active data decoder 23 is the contract that a component decoder must implement in one embodiment.

Figure 3:
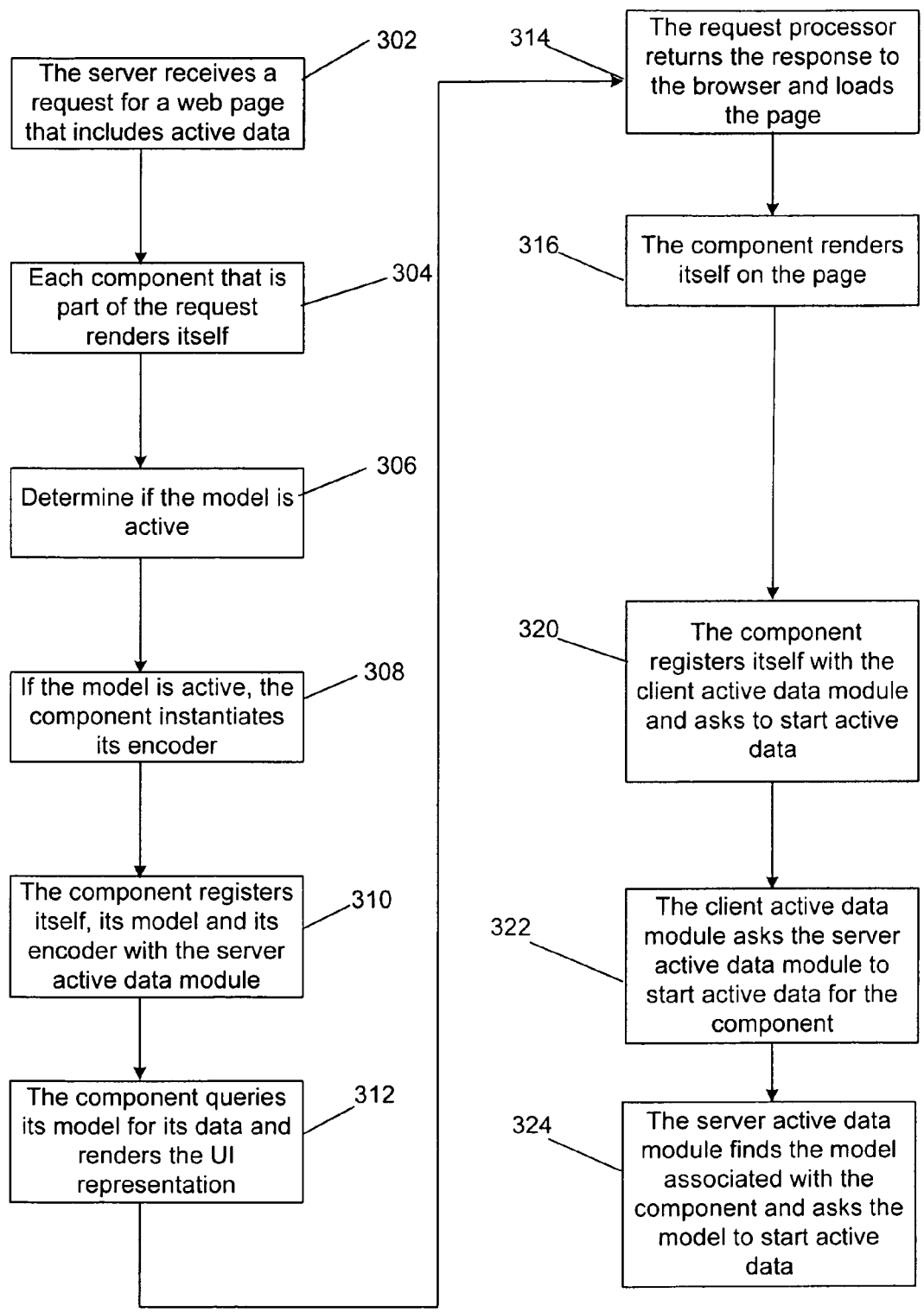
FIG. 3 is a flow diagram of the functionality of the client and the server to initiate active data push from the server to the client and to initiate the active data architecture of FIG. 3 in accordance with one embodiment.

FIG. 3 is a flow diagram of the functionality of client 12 and server 16 to initiate active data push from server 16 to client 12 and to initiate the active data architecture of FIG. 2 in accordance with one embodiment. In one embodiment, the functionality of the flow diagram of FIG. 3, and FIG. 4 below, is implemented by software stored in memory or other computer readable or tangible medium, and executed by a processor. In other embodiments, the functionality can be performed by hardware, or any combination of hardware and software.

At 302, server 16 receives a request for a web page that includes active data (i.e., an "active page"). The request may be generated by a user selecting a Uniform Resource Locator ("URL") from a web page within a web browser window on client 12. The URL would identify server 16 as the source of the request.

At 304, request processor 30 processes the request and asks each component 32 that is part of the request to render itself.

At 306, component 32 checks model 34 via active data model 35 to see if the model is active.

At 308, if model 34 is active, component 32 instantiates its encoder 26. If component 32 is not thread-safe and the encoder will run on a different thread than the component, the component copies enough information from itself into the encoder to allow the encoder to encode active data events without referring to the component.

At 310, component 32 registers itself, its model and its encoder with server active data module 28, which creates the reverse mapping from the model to its component and the component's encoder. At this point, server active data module 28 also adds itself as a listener to the model via active data model 35.

At 312, component 32 queries its model for its data and renders the UI representation (in one embodiment, in HTML, XML and Javascript) to the response.

At 314, request processor 30 returns the response to the browser and loads the page, which triggers response processor 18 to set up the client side framework and environment.

At 316, component 16 renders itself on the page.

At 320, component 16 registers itself with client active data module 20, and ask client active data module 20 to start active data.

At 322, client active data module 20 asks server active data module 28 to start active data for component 16.

At 324, server active data module 28 finds the model associated with the component, which was registered at 310, and asks the model to start active data via active data model 35.

In one embodiment, component 32 is active data aware, and therefore will perform the check at 306 above. At 306, the model can return if it is active or not based on declarative metadata. In one embodiment, the activeness of a component is determined by the model that it depends on. The introduction of active data model 35 allows a component to become active or not based on the activeness of its model. This division of work in the architecture in one embodiment of the present invention and the potential of declaratively turning on and off the active data support in an application results in many advantages.

Figure 4:
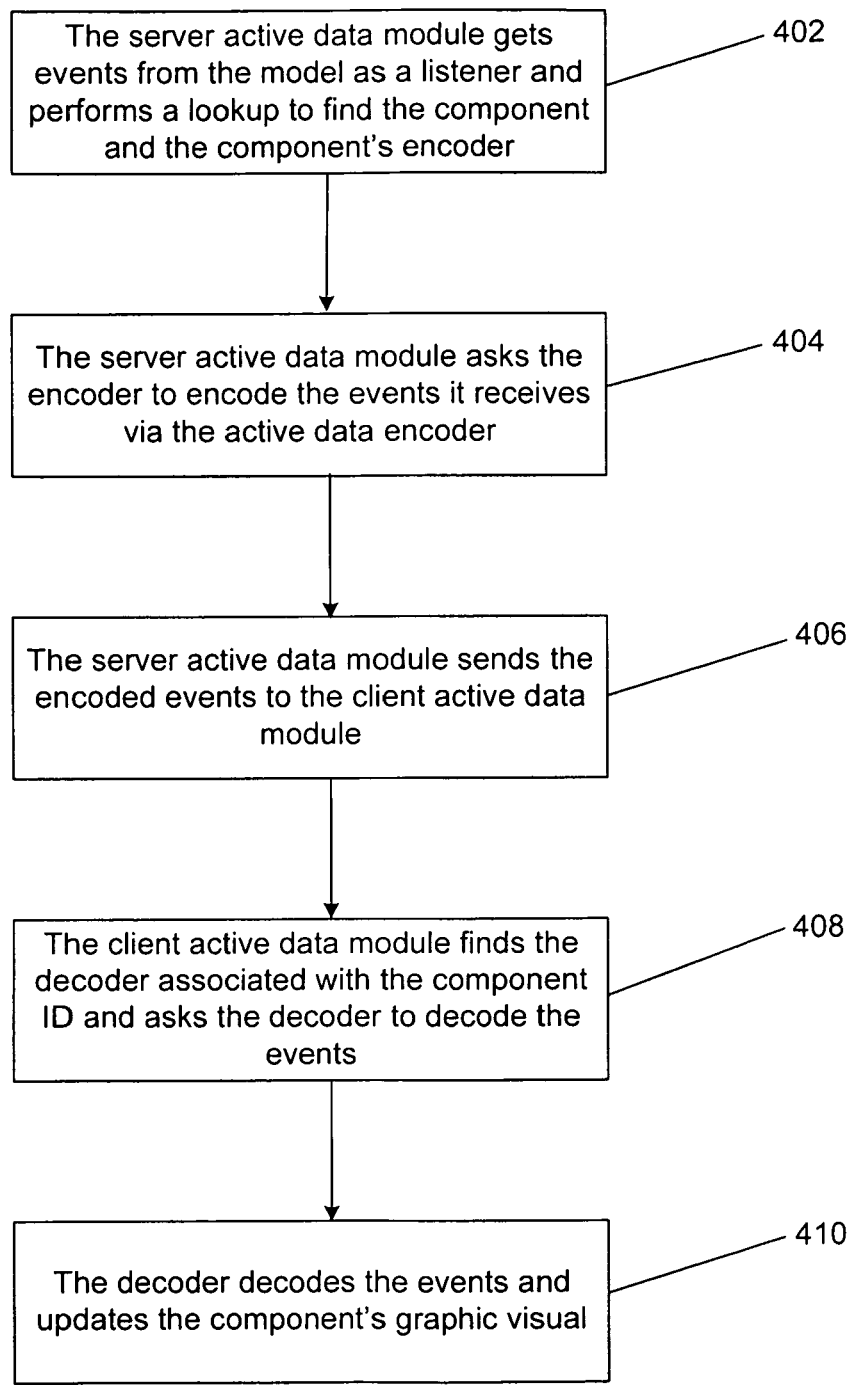
FIG. 4 is a flow diagram of the functionality of the client and the server to encode and decode the active data in accordance with one embodiment.

FIG. 4 is a flow diagram of the functionality of client 12 and server 16 to encode and decode the active data in accordance with one embodiment.

At 402, server active data module 28 gets events from model 34 as a listener. Server active data module 28 performs a lookup to find the component and the component's encoder from the mapping set up at 310 of FIG. 3.

At 404, server active data module 28 asks encoder 26 to encode the events it receives via active data encoder 31.

At 406, server active data module 28 sends the encoded events to client active data module 20, with the component ID that is received from component 32 at 402. The component ID identifies the targeted component on client 12 for the encoded events.

At 408, client active data module 20 finds the component associated with the component ID (registered at 320 of FIG. 3) and asks component 16 to decode the events. Component 16 delegates to its associated decoder 22 to decode the events.

At 410, decoder 22 decodes the events and updates the component's graphic visual.

The functionality disclosed in FIG. 4 of encoding (which transforms the native events fired from the model into instructions and data that can be interpreted by the decoder to update the component's visual and/or animate the change) and decoding (which interprets the instructions and data created by the encoder) create an abstraction for the active data service in one embodiment to collaborate with components that it does not know about thus keeping the architecture of FIG. 2 open. The component in this architecture takes ownership of making itself active and defines the data structure necessary to convey changes as well as render these changes.

The active data architecture disclosed in FIG. 2 is open and highly extensible. First, since it is based on a typical component-based architecture (on which most modern architectures, especially enterprise software architectures, are based), it takes full advantage of the openness, to the extent that it is open, of the underlying architecture. In a component-based architecture, there are usually well-defined mechanisms to introduce new UI components or new data sources (i.e., models). The active data architecture in accordance to embodiments of the present invention augments this without introducing abrupt and intrusive change to the underlying architecture while providing a well-defined mechanism for making any UI components or models active data capable.

Second, the addition of new system components and contracts to enable active data support are very clearly and cleanly defined, and the responsibilities and collaboration of these new and existing system components are well-factored and well-encapsulated, it is very easy to enable active data for an existing component-based software architecture.

In one embodiment, for a model to become active, active data model contract 35 is implemented and the model fires events using active data listener contract 29.

In one embodiment, for a component to become active, an encoder is implemented on the server side and a decoder is implemented on the client side. At rendering time on the server side, the encoder is registered with the server active data module and at rendering time on the client side, the decoder is registered with the client active data module.

In one embodiment, a non-active component can still work with a non-active model as well as an active model, and an active component can still work with a non-active model, even though in these cases there may be no active data support.

In one embodiment, if a user hides an active component such as, for example, switching to a different tab or accordion on the UI, active data transmission is stopped using the following functionality:

component 16 asks client active data module 20 to stop its active data;

client active data module 20 notes that component 16 no longer wants active data and instructs server active data module 28 to stop active data for component 16;

server active data module 28 finds the model associated with the component and ask the model to stop active data.

During this process, if there are events already fired and are being delivered, when they reach client active data module 20, client active data module 20 will discard them. Further, server active data module 28 can also detach itself from the model as a listener.

When a user unhides a component from the UI, such as for example by switching back to the original tab or accordion the active component is in, the client framework (response processor 18) makes an asynchronous request (e.g., an AJAX request) to request processor 30 to request the component to be re-rendered on the server side. This replaces the functionality of 302 of FIG. 3. This is followed by the same active data set-up sequence of FIG. 3 (304-322) except for one additional functionality after 312 and a refinement at 320:

At 312, component 32 will query the model of the last event ID via active data model 35 which will be carried in the response (at 314 of FIG. 3) to component 16 of client 12. This represents the latest event whose effect (insert/update/delete) is reflected in the data returned from model 34 to component 32 at 312.

At 320, component 16 passes in its last event ID to client active data 20 to start active data, which will get passed onto server active data 28 and model 34. The model will start firing events from the very next event after the event with the last event ID is passed in.

Server active data 28 will register itself again to the model as a listener during this process.

In one embodiment, actions are taken to account for component refresh. Component refresh is most likely triggered by a user gesture on a different component. It is very similar to showing/unhiding a component except that the component is always visible (i.e., not switching from a hidden state). An example of this would be an automobile make and model selector with two lists-one for makes and one for models. When the user chooses an automobile make, the list of models refreshes to only display the list of models available for that make. Component refresh could also be triggered by the client side framework and client active data 20. In one embodiment, during component refresh, active data for the component being refreshed will continue to be fired and surfaced to the client to reach the component. At least two approaches may be implemented in one embodiment to resolve component refresh issues:

Start Once Approach: Active data is started in the initial full page request (or subsequent full page request) and never stopped during partial page refresh. Component 16 will ignore events not newer than the last event ID it keeps. During refresh, however, component 16 will need to buffer events at 410 of FIG. 4 until the refresh returns and then goes through the buffer discarding events not newer than the new last event ID and apply those that are newer. This is necessary in one embodiment because there is a chance that events fired after the data has been queried may reach the browser first;

Stop/Start Approach: this is equivalent to doing a Hide first followed by a Unhide as disclosed above.

In one embodiment, in order to pause a component, the same functionality disclosed above to hide a component is followed except that server active data 28 should not remove itself from the model as a listener.

Resuming an active data for a component in one embodiment is similar to showing a component except that there is no request to re-render the component. Instead, component 16 requests client active data 20 to start its active data, passing its last event ID.

In one embodiment, in order to support active data event formatting, during initial request processing all locale specific information and other user preference contextual information are available from the request and therefore component 32 can render out the response appropriately according to the user's locale and other preferences. However, on event firing, such information may not be available and as a result, active data shown on the UI may not match user preferences and can be misleading.

To preserve contextual information for the user, additional functionality is added between 302 and 304 of FIG. 3 in order to store such information (usually locale information, formatting preferences, etc.) in the model.

At event firing time, encoder 26 can then ask the model to do the proper formatting based on the necessary contextual information recorded above. The encoder does not have direct knowledge of the model but can get to it via the event.

In the alternative, the model can encode the events before firing them to server active data 28. However, this may be disadvantageous because: (i) architecturally the model deals with data instead of presentation of data; (ii) events could be fired from an external data source that the model encapsulates and this requires the model to examine each event and apply the formatting; (iii) the encoder has to examine the events anyway; and (iv) events may not require formatting and it is better to let the encoder decide.

In one embodiment, excessive client side processing and delay is a avoided. There are at least two ways to ensure that active data are updated on the UI in a timely fashion. For one, at 402 of FIG. 4, events can be fired in batch. This gives the encoder a chance to decide whether it wants to encode every single event in the list and surface them to the client, or if it finds such a list to be too long (an event burst situation), to simply ask the component to refresh itself instead of applying the events to the component one by one in order to speed up the display of the latest state to the end user. To achieve this:

The encoding logic at 402 returns a Boolean flag to server active data 28 to indicate if the encoder simply wants to refresh the component;

Upon seeing this intention, server active data 28 then surfaces a predefined refresh event to client active data 20;

Upon receiving the refresh event, client active data 20 kicks off the refresh component logic disclosed above.

In the case where the encoder encodes every event in every batch surfaced by the model, the delivery of these events onto the network and processing of these events on the client side can still cause delay. The solution to this in one embodiment is to detect the potential network and processing delay and upon the delay crossing a predefined threshold, trigger the component refresh logic disclosed above.

In order to detect a delay:

At 322 of FIG. 3, upon establishing a channel connection, server active data 28 records the current server time and sends it to client active data 20 which then also records the current client time, subtracts the current server time and keeps the delta between the two time stamps. This represents the initial network delay, plus any time zone differences between client and server;

At 402 of FIG. 4, if a timestamp is not available in the event surfaced, the current server time is recorded as the event timestamp. The event timestamp is surfaced to client active data 20 at 406 of FIG. 4.

At 406, client active data 20 adds the delta to the event timestamp, then subtracts it from the current client time. If the difference is greater than a predefined threshold, client active data 20 kicks off the refresh component logic.

In one embodiment, the active data provides real time or near real time updates on the UI to indicate change to the user. Once active data is enabled for a component, it is important to notify the user when the data being shown to the user does not reflect the most current data or state of the models on which the UI components are based. In one embodiment, the following functionality is implemented to notify the user:

If data is late but has not crossed the threshold at 406 of FIG. 4, client active data 20 informs component 16 of the lateness and delay of the event. Component 16 can then choose to visually indicate such a delay.

If the channel is broken (because, for example, either at 322 client active data 20 fails to connect to server active data 28, or after 322 is successfully completed client active data 20 detects a broken connection), client active data 20 informs all active components on the page about the channel disconnected status. The status can be shown at the page level, and each component can choose to visually indicate such a state as well.

If the model backing the component has delays, or has trouble connecting to the data source that it encapsulates, it surfaces an event indicating such a status at 402. The encoder encodes this exception event properly at 404 to instruct the decoder to update the component to visually indicate this exception status in the model at 410. This exception event is unknown to server active data 28 and client active data 20, which just deliver the event like other regular events.

An alternative implementation for handling event bursts involves client active data 20 informing server active data 28 to slow the rate of events sent to the client and server active data 28 then informing each active data model 35 of the new rate. Once client active data 20 was capable of handling the new slower request rate it informs the server to increase the rate once again.

In one embodiment, it may be desirable to support active data via polling. For example, for bandwidth and scalability reason, there may be times when setting up a persistent connection to a server is not desirable or too expensive. In one embodiment, the following functionality handles polling:

In 322 of FIG. 3, server active data 28 checks if the active data is delivered via polling (usually configured in an external configuration file, or some runtime API hook to check user preference according to privilege and QoS requirements). If true, it writes to the response instructions to set client active data 20 into polling mode, with the polling interval;

At 324 of FIG. 3, when start active data is called on the model, the model fires all the events (from the last event ID passed in) to its listener (i.e., server active data 28 in the same thread, until there are no more events to fire);

After 404 but before 406 in FIG. 4, if polling is turned on, server active data 28 asks the model to stop active data after 404, then writes the encoded events to the response, and close the connection;

At 406, if polling is turned on, client active data 20 installs a timer with its timeout set to the polling interval. Upon timeout, the process is repeated, after which a new timer is installed for the next poll. And the process continues.

In one embodiment, since starting and stopping active data are performed on each poll, the processing of user gestures is changed. For gestures that require the stopping of active data (such as hiding and pausing component), it is not necessary to communicate this to server 16. For gestures that require the starting of active data (such as unhiding, refreshing and resuming component), the start requests can be batched and sent to the server on the next poll from client active data 20. On the server side, server active data 28 will start the models corresponding to the components included in the list passed in by client active data 20 and wait until all start active data calls return from these models before closing the connection.

In one embodiment, a stop request to client active data 20 should remove the requesting component from the list client active data 20 maintains if the component is already on the list because it cancels out the previous start request. For example, a user may switch to a tab that contains an active component and then switch away to another tab in between polling. The net effect should be a no operation for the component. If a start request comes in before the poll but the stop request comes after, the start request will be sent to server active data 28 to get the updates since the component's last event ID and the stop request will be ignored. Since active data is always started and stopped on the server side on each poll, there will not be a false start of active data.

Table 1 below lists the definition of active data model 35 interface in the Java programming language in accordance to one embodiment:

TABLE 1

```
package oracle.adf.view.rich.model;
import java.util.Collection;
import oracle.adf.view.rich.event.ActiveDataListener;
/**
 * ActiveDataModel is the interface that all data models
supporting pushing data must implement
 * to take advantage of framework support for pushing data
to the client.
 */
public interface ActiveDataModel
{
  /**
   * Supported active data policy
   */
  public enum ActiveDataPolicy
  {
    /**
     * Model will not generate any active events
     */
    STATIC,
    /**
     * Model will generate active events, and the events
should be encoded
     * and sent to client.
     */
    ACTIVE,
    /**
     * Model will generate active events, and components
bound to the model
     * should be marked as PPR targets when the events
occur.
     */
    PPR
  }
  /**
   * Return the active data policy of the model
   *
   * @return the active data policy of the model
   * @see ActiveDataPolicy
   */
  public ActiveDataPolicy getActiveDataPolicy();
  /**
   * Called by the DataUpdateManager to notify the
ActiveDataModel to start delivering
   * change notifications for the collections of the
containers identified by
   * the rowKeys
   *
   * @param rowKeys the container row keys of the
collection, from which the
   * ActiveDataListener receives active events. Pass null or
empty collection for root collection.
   * @param startChangeCount Change count to start sending
active data from.
   * @param listener ActiveDataListener for the
ActiceDataModel to use when notifying
   * the DataUpdateManager of changes
   *
   * @throws IllegalStateException if ActiveDataPolicy is
STATIC
   * @throws IllegalArgumentException if
<code>listener</code> is <code>null</code> or
   * the <code>startChangeCount</code> is greater than the
current change count.
   * @see #stopActiveData
   */
  public void startActiveData(Collection<Object> rowKeys,
int startChangeCount, ActiveDataListener listener);
  /**
   * Called by the DataUpdateManager to notify the
ActiveDataModel to stop delivering
   * change notifications for the collections of the
container identified by the
   * given rowKeys
   *
   * @param rowKeys the container row keys of the
collections, from which the
   * ActiveDataListener receives active events. Pass null or
empty collection for for root collection.
```

TABLE 1-continued

```
   * @param listener the ActiveDataListener to be removed
   * ActiveDataListener receives active events. Pass null
for root collection.
   *
   * @throws IllegalStateException If called on an
ActiveDataModel that was never
   * started by calling <code>startActiveData</code>
   * @see #startActiveData
   */
  public void stopActiveData(Collection<Object> rowKeys,
ActiveDataListener listener);
  /**
   * Returns the current monotonically increasing change
count for this ActiveDataModel
   * @return The current change count
   */
  public int getCurrentChangeCount( );
}
```

Table 2 below lists the definition of active data listener 29 interface in the Java programming language in accordance to one embodiment:

TABLE 2

```
package oracle.adf.view.rich.event;
/**
 * Listener called by an ActiveDataModel to inform the
DataUpdateManager that the
 * ActiveDataModel has changed.
 * @see
oracle.adf.view.rich.model.ActiveDataModel#startActiveData
 * @see
oracle.adf.view.rich.model.ActiveDataModel#stopActiveData
 */
public interface ActiveDataListener
{
  /**
   * Called by ActiveDataModel instances to inform the
listener that the
   * model has changed
   * <p>
   * @param event The active data event fired from
ActiveDataModel
   * @see ActiveDataUpdateEvent
   */
  public void dataChanged(ActiveDataUpdateEvent event);
  /**
   * Called by ActiveDataModel to inform the listener that
exception
   * occurs
   *
   * <p>
   * @param event The exception event fired from
ActiveDataModel
   * @see ActiveDataExceptionEvent
   */
  public void
handleActiveDataExcepton(ActiveDataExceptionEvent event);
}
```

Table 3 below lists the active data encoder 31 interface in the Java programming language in accordance to one embodiment:

TABLE 3

```
package oracle.adf.view.rich.activedata;
import java.io.IOException;
import java.io.Writer;
import oracle.adf.view.rich.event.ActiveDataExceptionEvent;
import oracle.adf.view.rich.event.ActiveDataUpdateEvent;
/**
 * ActiveDataEncoder is the abstract base class for all
encoders that encode
```

TABLE 3-continued

```
 * active data.
 */
public abstract class ActiveDataEncoder
{
    /**
     * Encode active data contents for the given
ActiveDataEvent. The encoded
     * contents is written to the writer. Encoder could
optionally choose not to
     * encode active data for reasons such as high volum of
change data. If active
     * data is not encoded, active data channel will notify
the component to
     * refresh to get lastest data.
     * <p>
     * @param event the active data upate event
     * @param writer the output writer used by the encoder to
write encoded
     * contents
     * @return return true to notify the component to refresh
itself; return
     * false if the active data is encoded;
     * @see ActiveDataUpdateEvent
     */
    public abstract boolean encode(ActiveDataUpdateEvent
event, Writer writer)
        throws IOException;
    /**
     *
     * @param event the active data exception event
     * @param writer the output writer used by the encoder to
write encoded
     * contents
     * @return return true to notify the component to refresh
itself; Otherwise
     * return false;
     *
     * @throws IOException
     */
    public abstract boolean encode(ActiveDataExceptionEvent
event, Writer writer)
        throws IOException;
```

Table 4 below lists an example of active data decoder 23 for an active table component in JavaScript in accordance to one embodiment:

TABLE 4

```
/**
 * @param {String} payload - DhtmlTextPeer only supports a
String payload representing the new value
 * @param {int} changeCount - Monotonically increasing
Change count for this change
 * @return {boolean} Returns <code>true</code> if the
component should continue to receive
 * active data events.
 * @override
 */
AdfDhtmlTablePeer.prototype.ProcessPushData =
function(payload, changeCount)
```

As disclosed, embodiments of the present invention enable active data support for any existing component-based architecture with the addition of the architecture components encoder 26, decoder 22, server active data module 28 and client active data module 20, and two sets of contracts (active data model 35/active data listener 29 and active data encoder 31/active data decoder 23). By clearly defining the roles and collaboration of existing and new architecture components, any UI component and any model (which makes any data source consumable by a UI component) can be easily enhanced to support active data, after a full page request, or on typical user gestures on the UI (hide/show/refresh/pause/resume component). Further, the active components and models work seamlessly when active data delivery from server to client is implemented using a polling mechanism.

Several embodiments are specifically illustrated and/or described herein. However, it will be appreciated that modifications and variations of are covered by the above teachings and within the purview of the appended claims without departing from the spirit and intended scope of the invention. For example, a computer readable medium may include electronic signals.

What is claimed is:

1. A computer readable medium having instructions stored thereon that, when executed by a processor, causes the processor to:
    receive a first request for a page that includes active data, wherein the active data comprises a component and a corresponding model for a data source of the component;
    determine if the model is active;
    if the model is active, instantiate an encoder that corresponds to the component;
    query the model for the active data and render a user interface representation of the data;
    return a response to the request with the user interface representation;
    receive a first active data from the model;
    determine a first component and a first encoder that corresponds to the model;
    request the first encoder to encode the first active data; and
    transmit the encoded first active data to a client.

2. The computer readable medium of claim 1, said instructions further causing the processor to:
    receive a second request to start active data transmission for the component; and
    request the model to start active data transmission.

3. The computer readable medium of claim 2, said instructions further causing the processor to:
    stop active data transmission if a user hides the component at a client.

4. The computer readable medium of claim 3, said instructions further causing the processor to:
    start active data transmission if the user unhides the component at a client.

5. The computer readable medium of claim 2, said instructions further causing the processor to:
    receive a request to refresh active data transmission;
    stop and start active data transmission in response to the refresh request.

6. The computer readable medium of claim 1, said instructions further causing the processor to:
    determine if the active data is delivered via polling.

7. The computer readable medium of claim 1, wherein the component is a JavaServer Faces component.

8. A method of delivering active data comprising:
    receiving a first request for a page that includes active data, wherein the active data comprises a component and a corresponding model for a data source of the component;
    determining if the model is active;
    if the model is active, instantiating an encoder that corresponds to the component;
    querying the model for the active data and rendering a user interface representation of the data;
    returning a response to the request with the user interface representation;
    receiving a first active data from the model;

determining a first component and first encoder that corresponds to the model;
requesting the first encoder to encode the first active data; and
transmitting the encoded first active data to a client.

9. The method of claim 8, further comprising:
receiving a second request to start active data transmission for the component; and
requesting the model to start active data transmission.

10. The method of claim 9, further comprising:
stopping active data transmission if a user hides the component at a client.

11. The method of claim 10, further comprising:
starting active data transmission if the user unhides the component at a client.

12. The method of claim 9, further comprising:
receiving a request to refresh active data transmission;
stopping and starting active data transmission in response to the refresh request.

13. The method of claim 8, further comprising:
determining if the active data is delivered via polling.

14. The method of claim 8, wherein the component is a JavaServer Faces component.

15. A system for pushing active data to a client comprising:
means for determining if the model is active after receiving a first request for a page that includes active data, wherein the active data comprises a component and a corresponding model for a data source of the component;
if the model is active, means for instantiating an encoder that corresponds to the component;
means for querying the model for the active data and rendering a user interface representation of the data;
means for returning a response to the request with the user interface representation;
means for receiving a first active data from the model;
means for determining a first component and first encoder that corresponds to the model;
means for requesting the first encoder to encode the first active data; and
means for transmitting the encoded first active data to a client.

* * * * *

UNITED STATES PATENT AND TRADEMARK OFFICE
CERTIFICATE OF CORRECTION

| | | |
|---|---|---|
| PATENT NO. | : 7,783,599 B2 | |
| APPLICATION NO. | : 12/031401 | |
| DATED | : August 24, 2010 | |
| INVENTOR(S) | : Sullivan et al. | |

It is certified that error appears in the above-identified patent and that said Letters Patent is hereby corrected as shown below:

In column 11, line 16, delete "upate" and insert -- update --, therefor.

Signed and Sealed this
Tenth Day of May, 2011

David J. Kappos
*Director of the United States Patent and Trademark Office*